INVENTOR
A. Robert Borden

BY George Moeller
Agent

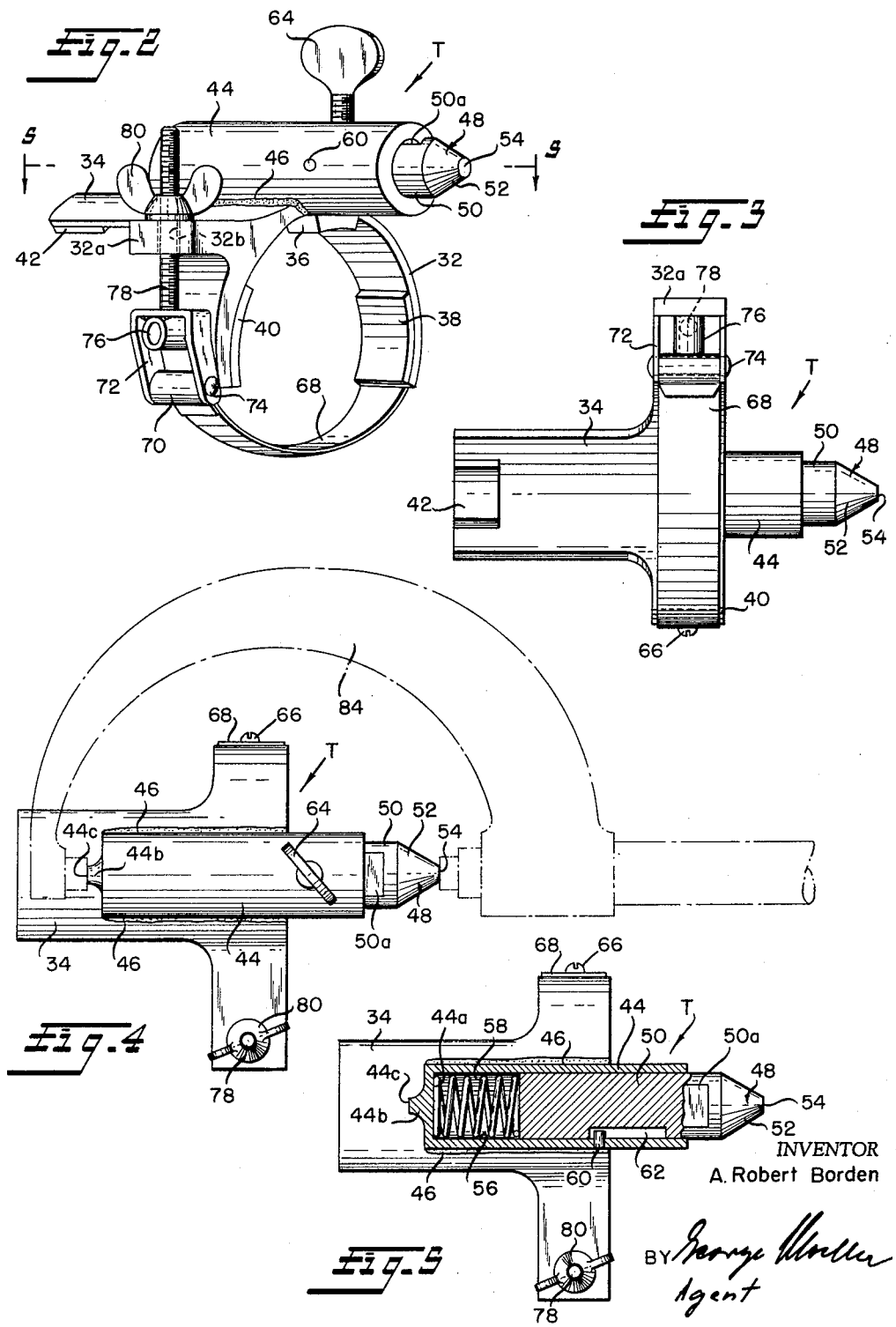

United States Patent Office 3,128,554
Patented Apr. 14, 1964

3,128,554
TOOL AND METHOD FOR MEASURING THE PROPER ANGLE BETWEEN ANGULARLY DISPOSED SHAFTS
Arthur Robert Borden, Birmingham, Mich., assignor to General Motors Corporation, Detroit, Mich., a corporation of Delaware
Filed Sept. 21, 1961, Ser. No. 139,722
6 Claims. (Cl. 33—1)

The present invention relates to a tool and method for measuring the proper angle between angularly disposed shafts. More specifically, the invention is concerned with measuring the proper angle between shafts joined by a universal joint such as the driveline between the transmission and the rear axle of an automobile.

It is known to use a bubble protractor for determining driveline angles. However, such a protractor is not sufficiently accurate. Most available protractors are not calibrated fine enough and the fact that it is necessary to work under the vehicle adds to greater inaccuracy. An error of 1° is not uncommon in taking a reading. The normal tolerance given for service is ½°. In some cases this tolerance is too great and may lead to some malfunction of the vehicle.

It is an object of the invention to provide a closer tolerance in measuring driveline angles.

Another object is to provide a low cost measuring tool which is simple and allows an easy measuring procedure.

Still another object is to provide a tool which takes the angular disposition of shafts and converts it into a linear measurement.

Another object is to use the trigonometrical function of the angle (tangent or co-tangent) instead of working with the angle itself.

Another object is to determine the angle from an angle conversion chart using the difference of two measurements to read the angle from the chart.

It is proposed to measure the driveline angle with a tool comprising means for detachably securing it to one shaft for contacting a reference surface of the other shaft. The tool is provided with a linearly extensible and retractable spring-loaded contact finger terminating in a contact end, said contact finger being located at a radial distance from the axis of said one shaft and movable parallel to said axis. Said tool further includes a stationary portion for guiding said contact finger, a measuring surface on said guide portion, and means for releasably locking said contact finger on said guide portion.

The method of measuring a driveline angle with this tool includes the steps of first measuring the distance between the contact end of said finger and the measuring surface of said guide portion with that finger being in an extended position and locked in said position; then securing said tool to said one shaft with the contact end contacting the reference surface on the other shaft, releasing the locking means and rotating said one shaft with the tool 180°, thereafter locking said contact finger in the contacting position to said guide portion and removing the tool from said one shaft. The next step is measuring the new distance between the contact end of the contact finger and measuring surface of the guide portion of the tool; thereafter determining the difference of said measurements by subtraction and calculating the driveline angle by using said difference between said measurements and the radial distance of the contact end from the axis of said one shaft. More conveniently this difference between the measurements can be used to determine the driveline angle directly from an angle conversion chart.

The drawings illustrate the driveline angle measuring tool and the procedure of using it.

FIGURE 2 is a perspective front view of the measuring tool.

FIGURE 3 is a bottom view of the tool.

FIGURE 4 is a top view of the tool.

FIGURE 5 also is a top view with a cross section through the contact finger and guide portion of the tool along line 5—5 of FIGURE 2.

Figure 6:
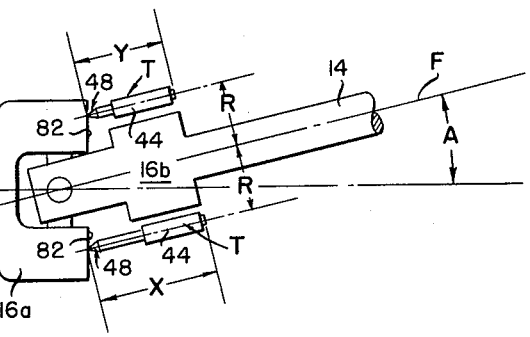

FIGURE 6 is a diagram illustrating how the tool is used.

Figure 7:
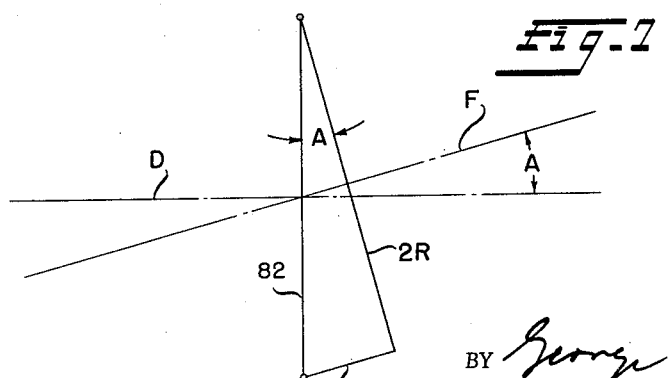

FIGURE 7 is another diagram illustrating the mathematical figures involved in the measuring procedure.

Figure 1:
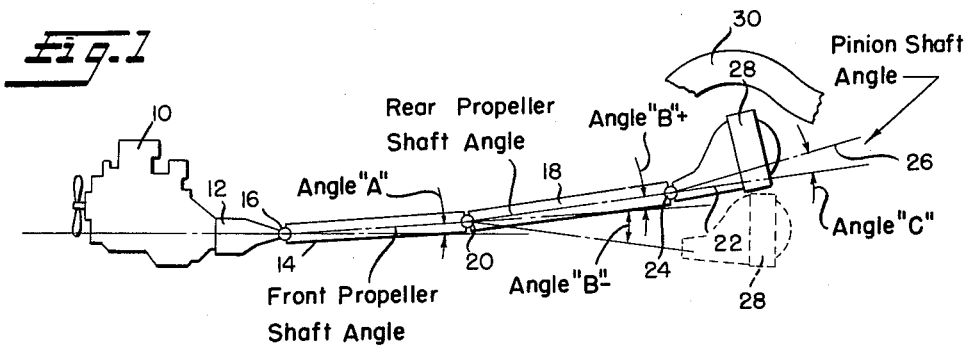
FIGURE 1 is a schematic diagram showing the driveline angles of an automobile.

In FIGURE 1, the driveline of an automobile is shown. The engine bears the numeral 10 and the transmission the numeral 12. Joined to the transmission shaft 13 by universal joint 16 is the front propeller shaft 14. The front propeller shaft angle is indicated as A. A universal joint 20 joins the front propeller shaft 14 to the rear propeller shaft 18. The rear propeller shaft angle is designated B+ in the upper position and in the downward position B—. Universal joint 24 joins the rear propeller shaft 18 to the pinion shaft located in the differential casing 28 on axis 26. The pinion shaft angle is designated C. The curved lines 30 above the differential casing 28 indicate a portion of the vehicle frame.

As can be seen more clearly from FIGURE 6, a universal joint, for instance joint 16, includes yoke 16a fastened to the transmission shaft 13 and yoke 16b fastened to the front propeller shaft 14. The yokes are interconnected in the conventional manner. The axis of shaft 13 is designated D and the axis of shaft 14 designated F.

The tool T for measuring the aforesaid driveline angles has a base including a semi-circular shaped portion 32 and an upper extension or tail portion 34. The base is provided with three preferably curved shoes 36, 38, 40 and a shoe 42 on the upper extension. Shoe 36 is in line with shoe 42 and in the same horizontal plane. The shoes insure proper seating of the tool on a shaft or the collar of the yoke of a joint. A barrel or guide member 44 is fixed, for instance, by welding at 46 to the top of base 32, 34. Received in barrel 44 is a contact finger or plunger 48 made of steel. The plunger has a cylindrical portion 50 and a tapered tip 52 with a flat or rounded end face 54. Portion 50 of plunger 48 is guided in the cylindrical blind bore 56 of barrel 44 (see FIG. 5). The axis of the plunger is parallel to the axis of the shaft to which the tool is adapted to be attached. A coil spring 58 abutting the inner face of end wall 44a of blind bore 56 and the end face of plunger portion 50 urges the plunger axially outwardly. Movement of the plunger is limited by a stop pin 60 in the wall of barrel 44 cooperating with an elongated groove 62 of the plunger. The end walls of groove 62 engage stop pin 60 in the outermost and innermost positions of plunger 48. A thumb screw 64 screwed in the upper barrel wall locks plunger 48 in any desired position. The end of the screw shaft engages flattened portion 50a on top of the plunger. The barrel end wall 44a carries a small projection 44b with a flat machined measuring surface 44c. Attached to the base portion 32 by rivets or screws 66 is a strap 68. The strap may be a thin steel band or may be made of other suitable material and constitutes a means for fastening the angle measuring tool to a shaft. The strap has an eye 70 at its free end to which a U-shaped yoke 72 is pivoted by rivet 74. The base of the yoke is provided with a bearing 76 for the head of a screw bolt 78. The shaft of the screw bolt 78 extends through a hole 32b in the ear 32a extending laterally from the base 32. A wing nut 80 engages the threads of screw bolt 78 so that strap 68 can be tightened to secure the tool on a shaft. For removing the tool the wing nut 80 is taken off and bolt 78 withdrawn from the hole 32b.

The procedure of measuring a driveline angle with the angle measuring tool T is as follows: Thumb screw 64 on top of the barrel is released so that the spring loaded plunger 48 may extend fully outwardly. This position is limited by stop 60 and one end wall of groove 62. The thumb screw 64 is thereafter tightened to lock the plunger in this position. A micrometer 84 shown in phantom lines in FIGURE 4 is then used to measure the distance between measuring surface 44c and the end face 54 of the plunger. This measurement is recorded and corresponds to the distance $x$ (see FIGURE 6). Thereafter, the tool T is secured, for instance, to the front propeller shaft 14 by means of strap 68 and screw 78 and nut 80. Preferably, the tool is positioned on the bottom of the shaft as shown schematically in FIGURE 6. The tool is so positioned that the end 54 of contact finger 48 just contacts the yoke 16a on the transmission output shaft 13. The face 82 of yoke 16a is used as a reference surface.

A planar surface of a disk (not shown) clamped on yoke 16a of the universal joint 16 could also be used as a reference surface. Thereafter, the thumb screw 64 is loosened so that plunger 48 can retract and the front propeller shaft 14 with tool rotated 180° to the top position, as schematically shown in FIGURE 6. The plunger end face 54 then contacts reference surface 82 of yoke 16a at a shorter distance. This distance is indicated by the letter Y. After the propeller shaft with tool has been rotated 180° the thumb screw 64 is tightened to lock the plunger 48 to the barrel 44. Then the tool is removed from the top of front propeller shaft 14 and the new distance between measuring surface 44c of the barrel and the end face 54 of the plunger measured by micrometer 84. The measured distance Y is recorded. As can be seen from FIGURE 6, the axes of the plunger 48 and barrel 44 are located at a distance R from the axis F of the front propeller shaft 14. The measured distance Y is then subtracted from the first measured distance $x$. The difference $z = x - Y$. As can be seen from FIGURE 7, the reference surface 82, the distance 2R and the distance $z$ form a right-angled triangle and the angle between the reference surface 82 and the distance 2R equals the driveline angle A; therefore, for instance, the driveline angle can be calculated as $$tg A = \frac{z}{2R}$$

An angle conversion chart may be developed based on a certain radial distance R. Such conversion chart is shown below. Using the conversion chart, the number closest to the difference $z$ obtained during measurement has to be found in one of the columns. Reading the chart upwards gives the degrees of the angle and reading over to the left gives the minutes. The driveline angles B+, B− and C can be determined in a manner analogous to finding driveline angle A.

*Angle Conversion Chart*

| | 0° | 1° | 2° | 3° | 4° |
|---|---|---|---|---|---|
| 0′ | .000 | .052 | .105 | .157 | .210 |
| 5′ | .004 | .057 | .109 | .162 | .214 |
| 10′ | .009 | .061 | .114 | .166 | .218 |
| 15′ (¼°) | .013 | .066 | .118 | .170 | .223 |
| 20′ | .017 | .070 | .122 | .174 | .227 |
| 25′ | .022 | .074 | .126 | .179 | .232 |
| 30′ (½°) | .026 | .079 | .131 | .184 | .236 |
| 35′ | .031 | .083 | .136 | .188 | .240 |
| 40′ | .035 | .087 | .140 | .192 | .245 |
| 45′ (¾°) | .039 | .091 | .145 | .196 | .250 |
| 50′ | .044 | .096 | .149 | .201 | .254 |
| 55′ | .048 | .100 | .153 | .205 | .258 |

It is to be understood that modifications and changes may be made in this invention without departing from the spirit and scope thereof as set forth in the appended claims.

I claim:
1. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in a desired position and locked in said position, securing said tool to said one shaft with the contact end contacting said reference surface on said other shaft, releasing said locking means, rotating said one shaft with tool 180°, locking said contact finger in the contacting position to said guide portion, removing said tool from said one shaft, then measuring the new distance between said contact end of said finger and said measuring surface of said guide portion, determining the difference of said measurements by subtraction and calculating the driveline angle by using said difference between said measurements and the radial distance of said contact end from the axis of said one shaft.

2. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in an extended position and locked in said position, securing said tool to said one shaft at the bottom thereof with the contact end contacting said reference surface on said other shaft, releasing said locking means, rotating said one shaft with tool 180°, the tool being then on top of said one shaft, locking said contact finger in the contacting position to said guide portion, removing the said tool from the top of said one shaft, then measuring the new distance between said contact end of said finger and said measuring surface of said guide portion, subtracting the second measurement from the first measurement and calculating the driveline angle by using the difference between first and second measurement and the radial distance of said contact end from the axis of said one shaft.

3. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in a desired position and locked in said position, securing said tool to said one shaft with the contact end contacting said reference surface on said other shaft, releasing said locking means, rotating said one shaft with tool 180°, locking said contact finger in the contacting position to said guide portion, removing said tool from said one shaft, then measuring the distance between said contact end of said finger and said measuring surface of said guide portion, determining the difference of said measurements by subtraction and using said difference for reading the driveline angle from an angle conversion chart.

4. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in an extended position and locked in said position, securing said tool to said one shaft at the bottom thereof with the contact end contacting said reference surface on said other shaft, releasing said locking means, rotating said one shaft with tool 180° the tool being then on top of said one shaft, locking said contact finger in the contacting position to said guide portion, removing the said tool from the top of said one shaft, then measuring the new distance between said contact end of said finger and said measuring surface of said guide portion, subtracting the second measurement from the first measurement and using said difference for reading the driveline angle from an angle conversion chart.

5. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in a desired position and locked in said position, securing said tool to said one shaft with the contact end contacting said reference surface on said other shaft, releasing said locking means, rotating said one shaft with tool 180°, locking said contact finger in the contacting position to said guide portion, removing said tool from said one shaft, then measuring the new distance between said contact end of said finger and said measuring surface of said guide portion, determining the difference between said measurements and using said difference to determine the driveline angle.

6. A method for determining the driveline angle between a pair of shafts coupled by a universal joint by means of a tool detachably secured to one shaft for contacting a reference surface on the other shaft, said tool having a linearly extensible and retractable spring-loaded contact finger terminating in a contact end, said contact finger being located at a radial distance from the axis of said one shaft and movable parallel to said axis, a stationary portion for guiding said contact finger, a measuring surface on said guide portion and means for releasably locking said contact finger on said guide portion, said method comprising the steps of measuring first the distance between the contact end of said finger and the measuring surface of said guide portion with said finger being in an extended position and locked in said position, securing said tool to said one shaft at the bottom thereof with the contact end contacting said reference surface on said other shaft, releasing said locking means, rotating said one shaft with tool 180° the tool being then on top of said one shaft, locking said contact finger in the contacting position to said guide portion, removing the said tool from the top of said one shaft, then measuring the new distance between said contact end of said finger and said measuring surface of said guide portion, determining the difference between the first measurement and the second measurement and using said difference to determine the driveline angle.

References Cited in the file of this patent
UNITED STATES PATENTS

| | | |
|---|---|---|
| 685,288 | Miller | Oct. 29, 1901 |
| 1,952,965 | Beard | Mar. 27, 1934 |
| 2,516,854 | Christian | Aug. 1, 1950 |
| 2,596,204 | Bryson | May 13, 1952 |
| 2,649,782 | Smith | Aug. 25, 1953 |
| 2,815,582 | Karstens | Dec. 10, 1957 |

FOREIGN PATENTS

| | | |
|---|---|---|
| 564,699 | Great Britain | Oct. 10, 1944 |